(12) United States Patent
Tsai (10) Patent No.: US 6,456,327 B1
(45) Date of Patent: Sep. 24, 2002

(54) MULTI-LENSES OPTICAL DEVICE

(75) Inventor: Jenn-Tsair Tsai, Taipei Hsien (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/054,991

(22) Filed: Apr. 3, 1998

(30) Foreign Application Priority Data

Jul. 2, 1997 (TW) ...................................... 86210970 U (51) Int. Cl.[7] .............................................. H04N 5/225
(52) U.S. Cl. .................... 348/344; 250/208.1; 250/234; 348/218; 358/483; 358/634
(58) Field of Search ............................. 348/36, 38, 39, 348/218, 344, 343; 358/474, 482, 483; 359/593, 629, 633, 634; 250/234, 208.1

(56) References Cited

U.S. PATENT DOCUMENTS

| | | | | |
|---|---|---|---|---|
| 5,390,032 A | * | 2/1995 | Yamamoto et al. | ......... 358/474 |
| 5,734,477 A | * | 3/1998 | Tsai | ............................ 358/474 |
| 5,864,133 A | * | 1/1999 | Tsai | ......................... 250/208.1 |
| 5,942,746 A | * | 8/1999 | Tsai | ......................... 250/208.1 |
| 5,986,254 A | * | 11/1999 | Tsai | ......................... 250/208.1 |
| 6,233,063 B1 | * | 5/2001 | Bernasconi et al. | ........ 358/474 |

* cited by examiner

Primary Examiner—Wendy R. Garber
Assistant Examiner—Jason Whipkey
(74) Attorney, Agent, or Firm—Brown, Martin, Haller & McClain, LLP (57) ABSTRACT

A multi-lenses optical device with high resolution and low cost is provided for converting an image into electronic signals. The optical device includes a plurality of focusing units for focusing a plurality of sections of the image respectively, and correspondingly generating a plurality of focused image sections magnified with the same ratio and having different optical path lengths, a photoelectric conversion unit for converting the plurality of focused image sections to the electronic signals, a switching unit for sequentially having only one of the focused image sections transmitted to the photoelectric conversion unit at an instant, and a light-reflecting unit mounted between the photoelectric conversion unit and the plurality of focusing units for transmitting the plurality of focused image sections to the photoelectric conversion unit.

15 Claims, 6 Drawing Sheets

MULTI-LENSES OPTICAL DEVICE

FIELD OF THE INVENTION

The present invention is related to an optical device, and more particularly to a multi-lenses optical device.

BACKGROUND OF THE INVENTION

Figure 1:
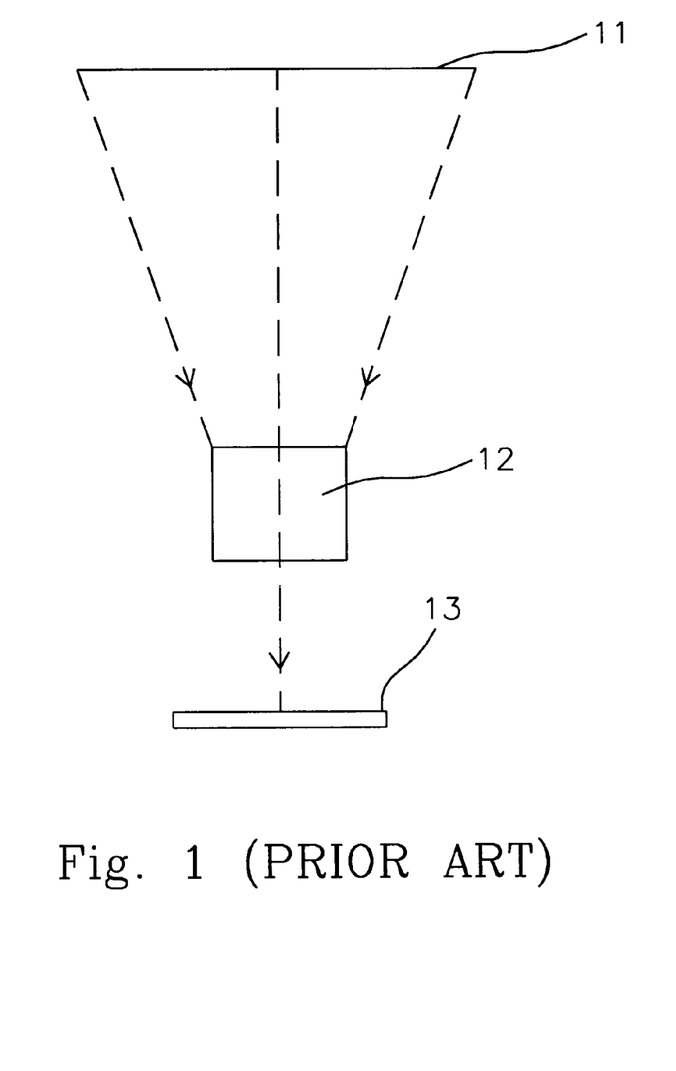
FIG. 1 is a schematic diagram showing the operation of a conventional scanner.

Image processing is often used for photography or movie. As we know, the scanner plays an indispensable role in this field. Increasing the resolution of a scanner is investigated hard in order to get more clear images, but high cost of a scanner with high resolution is not avoidable. The operating principle of the conventional scanner is shown in FIG. 1. An article is placed on the scanner to be scanned. The article is lit by a light source for generating an optical image 11. The optical image 11 of the article is focused on a charge coupled device 13 by a lens set 12, and then is converted to electronic signals to form digital data by the charge coupled device 13. For obtaining a higher resolution, the number of pixels for the charge coupled device 13 must be increased. However, the cost of the charge coupled device 13 is proportional to the square of the number of pixels for it. Requiring higher resolution will thus cost much since the cost of a charge coupled device 13 is a great part of the production cost of a scanner. Frankly speaking, it is difficult to spend lower cost for obtaining higher resolution in the first prior art.

Figure 2:
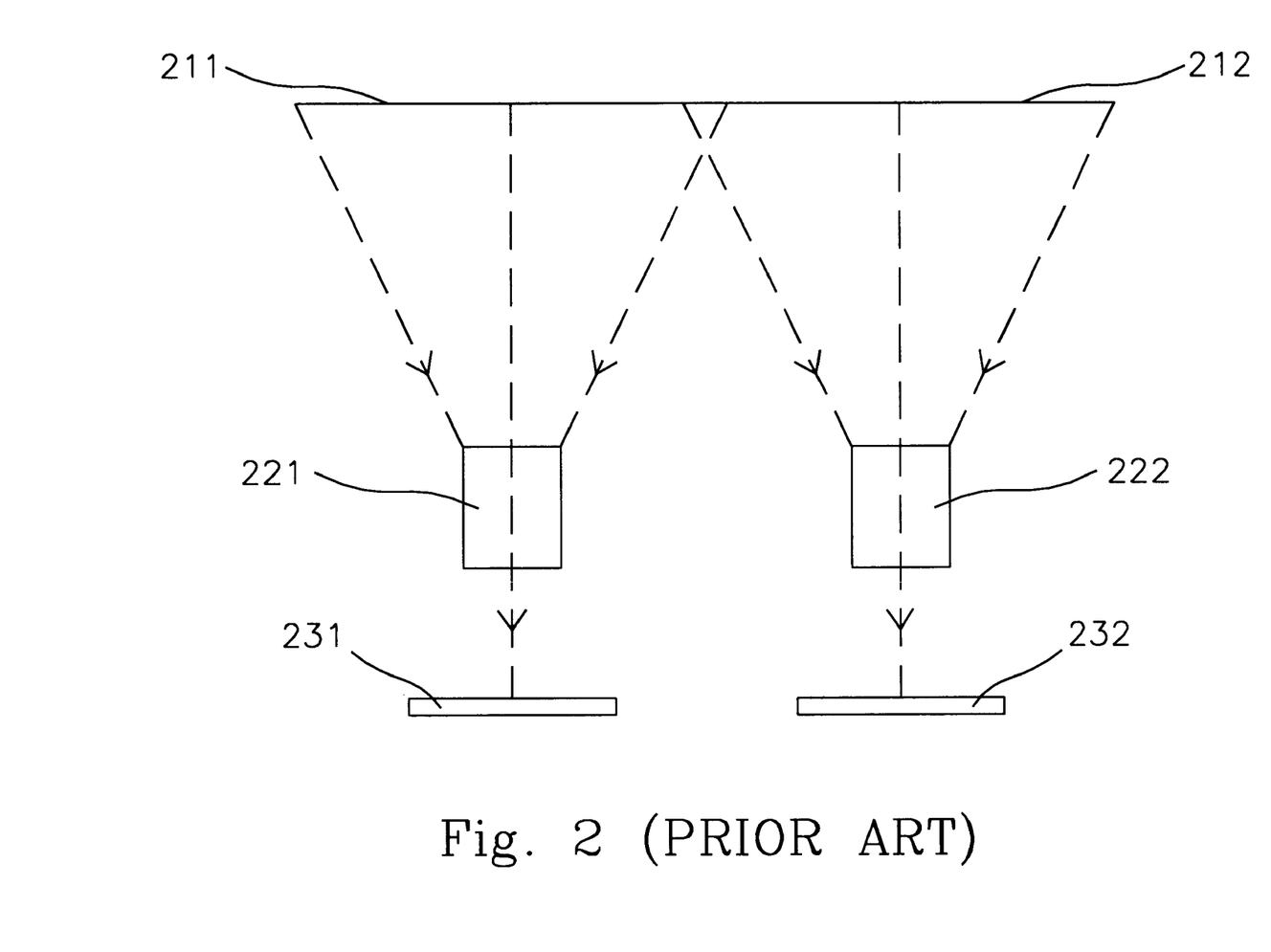
FIG. 2 is a schematic diagram showing the operation of another conventional scanner.

Another method also has been developed to solve the problem of high-cost. Please refer to FIG. 2 showing the operating principle of a scanner according to the second prior art. The optical image of the scanned article is divided into two sections 211 and 212. There are many corresponding lens sets 221 and 222 and corresponding charge coupled devices 231 and 232 for the optical image sections 211 and 212 in this scanner. Different sections 211 and 212 are converted to electronic signals by the same steps as the first prior art by respective lens sets 221 and 222 and charge coupled devices 231 and 232. Finally, the electronic signals will be combined together to form a full image. Hence, the number of pixels for a charge coupled device is reduced, but the performance can be still maintained like that of the prior art. The cost can be reduced by this arrangement. However, the cost is proportional to the number of charge coupled devices. Accordingly, we still hope to make an improvement in increasing resolution and decreasing cost.

SUMMARY OF THE INVENTION

An objective of the present invention is to provide a multi-lenses optical device with high resolution, but with less pixels for a photoelectric conversion unit.

In accordance with the present invention, a multi-lenses optical device for converting an initial image to electronic signals includes a plurality of focusing units, a photoelectric conversion unit, a switching unit, and a light-reflecting unit mounted between the photoelectric conversion unit and the plurality of focusing units. The plurality of focusing units are used for focusing a plurality of sections of the initial image respectively, and correspondingly generating a plurality of focused image sections magnified with the same ratio and having different optical path lengths. The photoelectric conversion unit, e.g. charge coupled device, is used for converting the corresponding focused image sections to electronic signals. The switching unit is used for sequentially having each one of the plurality of focused image sections selected and having the selected focused image section transmitted to the photoelectric conversion unit. The light-reflecting unit is used for transmitting the plurality of focused image sections to the photoelectric conversion unit.

In accordance with another aspect of the present invention, the focusing units are lens sets respectively mounted in specific locations for generating the corresponding focused image sections magnified with the same ratio.

In accordance with another aspect of the present invention, the light-reflecting unit preferably includes a first dichroic mirror for transmitting the plurality of focused image sections to the photoelectric conversion unit, and a reflective mirror or a second dichroic mirror for transmitting the plurality of focused image sections from the plurality of focusing units to the first dichroic mirror.

In accordance with another aspect of the present invention, the number of the plurality of focusing units is from 2 to 4.

In accordance with another aspect of the present invention, the switching unit is a light shade set.

In accordance with another aspect of the present invention, the light shade set preferably includes a movable light shade.

In accordance with another aspect of the present invention, the movable light shade may be mounted within the light paths of the plurality of initial image sections for shading the plurality of focusing units from the respective initial image sections except a selected section of the initial image corresponding to the selected focused image section at the instant.

In accordance with another aspect of the present invention, the movable light shade may be mounted between the light-reflecting unit and the plurality of focusing units for shading the light-reflecting unit from the plurality of focused image sections except the selected one generated by a selected focusing unit at the instant.

In accordance with another aspect of the present invention, the movable light shade may be mounted within the light-reflecting unit for shading the photoelectric conversion unit from the plurality of focused image sections except the selected one.

In accordance with another aspect of the present invention, the light shade set preferably includes a rotatable light shade.

In accordance with another aspect of the present invention, the rotatable light shade may be mounted between the light-reflecting unit or within the light-reflecting unit. It is rotated to be in different directions for shading the photoelectric conversion unit from the plurality of focused image sections except the selected one.

The present invention may best be understood through the following description with reference to the accompanying drawings, in which:

DETAILED DESCRIPTION OF THE PREFERRED EMBODIMENT

The present invention will be described more detailedly with reference to the following embodiments. It is to be noted that the following descriptions of the preferred embodiments of this invention are presented herein for the purpose of illustration and description only; it is not intended to be exhaustive or to be limited to the precise form disclosed.

Figure 3:
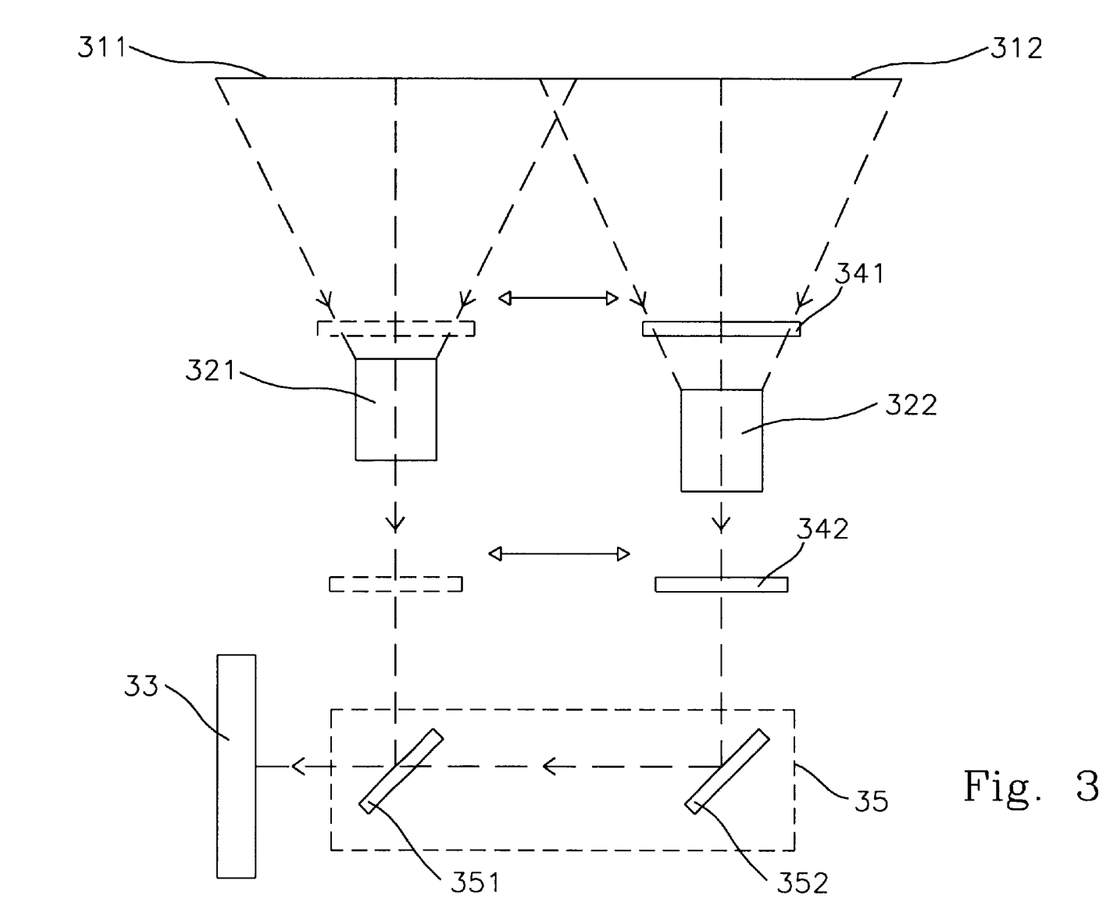
FIG. 3 is a schematic diagram showing two preferred embodiments of the operation of a scanner according to the present invention.

Please refer to FIG. 3 which is a schematic diagram showing some preferred embodiments of a scanner according to the present invention. As shown in FIG. 3, the scanner has two lens sets 321 and 322 mounted in specific locations so that the ratio of image distance to object distance of the lens set 321 is the same as that of the lens set 322 according to the lens maker's equation. Hence, the magnifying power of the lens set 321, defined as a ratio of image distance to object distance, is the same as that of the lens set 322. An article is placed on the scanner and is lit by a light source to generate an initial image. The initial image is divided into two sections 311 and 312 to be scanned sequentially. The first initial image section 311 is focused by one lens set 321 for generating a first focused image section, while the second initial image section 312 is focused by the other lens set 322 for generating a second focused image section. Since the magnifying power of the lens sets 321 and 322 is the same, the full image will not be distorted when these two focused image sections are combined together. The light-reflecting unit 35 includes a dichroic mirror 351 and a reflective mirror 352. The so-called dichroic mirror can reflect or transmit light at both sides. The reflectance and the transmittance at each side of the dichroic mirror can be modified according to the requirement of users Hence, the dichroic mirror 351 can transmit the focused image section from the reflective mirror 352 in a transmissive mode and from the lens set 321 in a reflective mode. Certainly, the reflective mirror 352 may be replaced by another dichroic mirror, but a dichroic mirror is more expensive than a reflective mirror. There are two movable light shades 341 and 342 shown in this figure, but only one is needed when this optical device is put into practice. The light shades are defined as "switching unit" because they are used for obstructing undesired initial image sections or undesired focused image sections, in other words, "switching" among the lens sets to have only one initial image section focused by the corresponding lens set or have only one focused image section sensed by the charge coupled device. The two preferred embodiments are described as follows.

Embodiment 1

A movable light shade 341, for instance, is equipped in a scanner. First of all, the movable light shade 341 is moved to be located in front of lens set 322 so that the second initial image section 312 can not be focused by the lens set 322 and only the first initial image section 311 can be focused by the lens set 321. The lens set 321 generates the first focused image section to be transmitted to the charge coupled device 33 through the dichroic mirror 351. Then, it is sensed and converted to electronic signals by the charge coupled device 33. Thereafter, the movable light shade 341 is moved to be located in front of lens set 321 so the first initial image section 311 is obstructed by the movable light shade 341, and only the second initial image section 312 can be focused by the lens set 322. The lens set 322 generates the second focused image section which is transmitted to the charge coupled device 33 through the reflective mirror 352 and dichroic mirror 351 in sequence. Then, the second focused image section is sensed and converted to electronic signals. At last, all these generated electronic signals are transformed to digital data and a full image is shown on a computer screen or other image processing equipments. Although the optical path lengths of object distance plus image distance of each lens sets are different, the magnifying power of each lens sets is the same. Hence, the combined full image is not distorted.

Embodiment 2

If the switching unit includes the movable light shade 342, the scanning principle is a little different. To begin with, the movable light shade 342 is moved to be located in back of the lens set 322 so the second focused image section generated by the lens set 322 responding to the second initial image section 312 can not reach the light-reflecting unit 35. Only the first focused image section generated by the lens 321 responding to the first initial image section 311 can be transmitted to the charge coupled device 33. The next in order, the movable light shade 342 is moved leftward to be placed in back of lens set 321 so that the first focused image section is obstructed. Only the second focused image section is sensed by the charge coupled device 33 by way of light-reflecting unit 35. The following steps and light paths of focused image sections are the same as described in EMBODIMENT 1 and do not explain tautologically.

The number of the focusing units can be increased to any requirement, preferable two to four. Their operating functions are similar to the above description. A preferred embodiment of a scanner having three focusing units is described briefly as follows.

Embodiment 3

Figure 4:
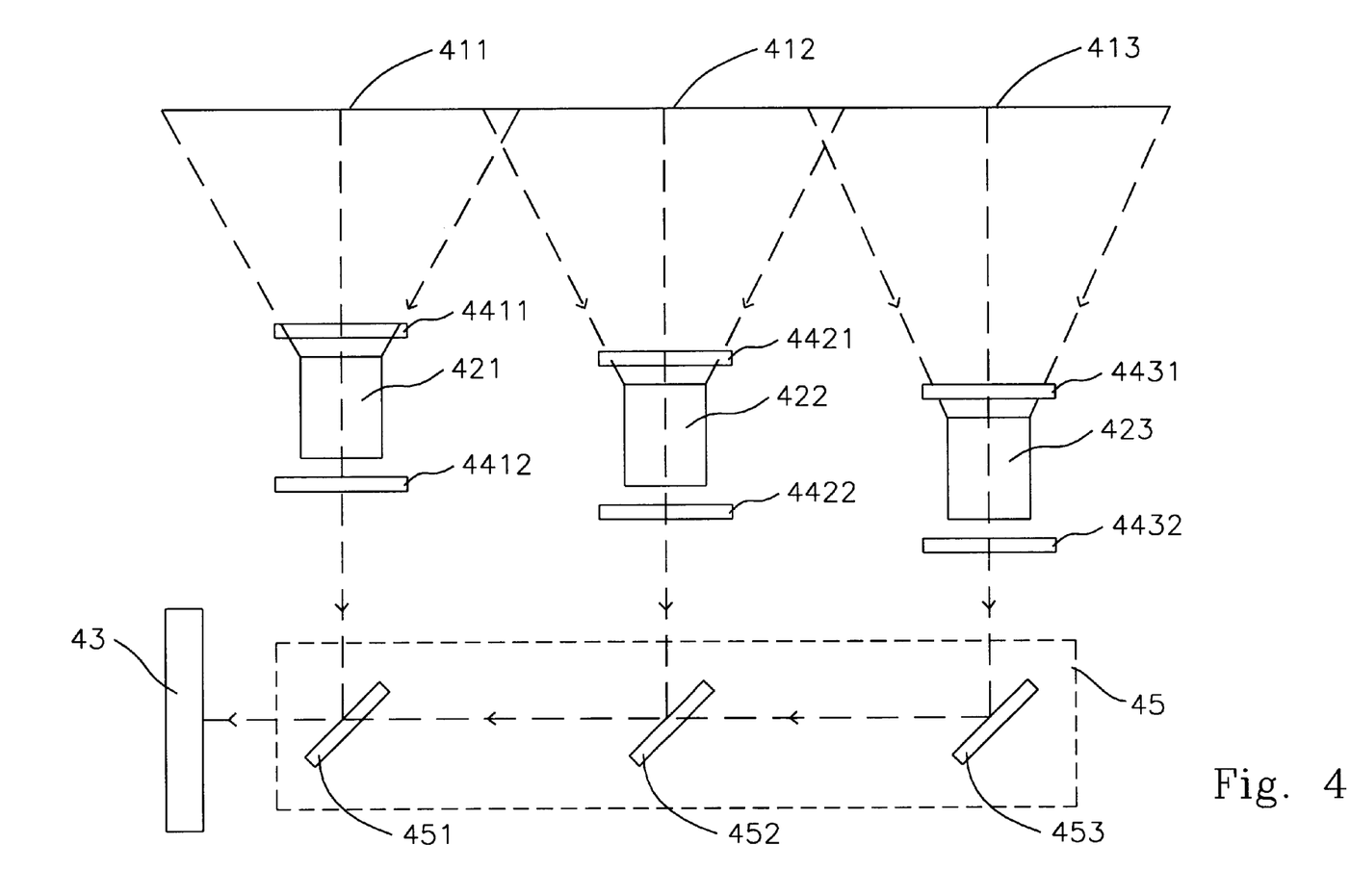
FIG. 4 is a schematic diagram showing a third preferred embodiments of the operation of a scanner according to the present invention.

Please refer to FIG. 4. There are three lens sets 421, 422, and 423 corresponding to the left initial image section 411, the middle initial image section 412, and the right initial image section 413 respectively. The light-reflecting unit 45 includes two dichroic mirrors 451 and 452 and a reflective mirror 453 corresponding to lens sets 421, 422, and 423. Each lens set is accompanied by only one movable light shade. In other words, only one of the movable light shades 4411 and 4412 is adopted to match the lens set 421 in the scanner. By the same token, only one of the movable light shades 4421 and 4422, and only one of the movable light shades 4431 and 4432 are required. All possible movable light shades shown in the diagram are not essential. All the possibilities are indicated in the figure. The switching unit, for example, includes the movable light shades 4411, 4421, and 4431. First of all, the movable light shades 4411 belonged to the lens set 421 is dislodged from the lens set 421 (hereafter called "non-obstructive state"), and the other movable light shades 4421 and 4431 are provided in front of other lens sets 422 and 423 (hereafter called "obstructive state"). The left initial image section 411 is focused by the lens set 421 to generate a left focused image section. The left focused image section is transmitted through the dichroic mirror 451 and is sensed and converted to electronic signals by the charge coupled device 43. Secondly, the movable light shade 4421 belonged to lens 422 is in a non-obstructive state and the other movable light shades 4411 and 4431 are in an obstructive state. The middle initial image section 412 is focused by the lens set 422 for generating a middle focused image section. Thereafter, the middle focused image section is transmitted to the charge coupled device 43 through the dichroic mirrors 452 and 451 in sequence, and is converted to electronic signals by the charge coupled device 43. Afterward, the movable light shade 4431 is in a non-obstructive state and the other movable light shades 4411 and 4421 are in an obstructive state. The right initial image section 413 is focused by the lens set 423 to generate a right focused image section. The right focused image section is then transmitted to the charge coupled device 43 through the reflective mirror 453, two dichroic mirrors 452 and 451 in sequence and is converted into electronic signals. All these generated electronic signals are transformed to digital data for being processed later. The words "left", "middle", and "right" are not used to limit the scope of the present invention, but used to illustrate the preferred embodiment more clearly. The operating sequence also can be modified to make the method more convenient for the manufacturers and users.

The feature of above-described preferred embodiments is that the initial image is divided into many sections to be scanned in sequence. Therefore, the resolution can be improved without increasing the number of charge coupled devices or the number of pixels for a charge coupled device. Thus, high resolution and low cost can be achieved at the same time. The costs of some focusing units and a light-reflecting unit required for the embodiment according to the present invention are quite cheaper than that of charge coupled device. Therefore, the cost can be significantly reduced. In addition, the optical elements including lens sets, mirrors, and charge coupled device are kept immobily. It is well known that the precision of a scanner is obviously influenced by the positions of optical elements. Few movable light shades are adopted in the preferred embodiments of the present invention to shade undesired initial image sections and undesired focused image sections at an instant. The movable light shade can be mounted in front of the lens set, between the lens set and the light-reflecting unit, or within the light-reflecting unit just according to one's requirement. The precision of the scanner according to the present invention keeps unerring because the positions of other optical elements will not be influenced by moving the light shades. The other driving elements provided for the precision according to the prior arts are not needed so that the size and the production cost are significantly reduced.

Embodiment 4

Figure 5:
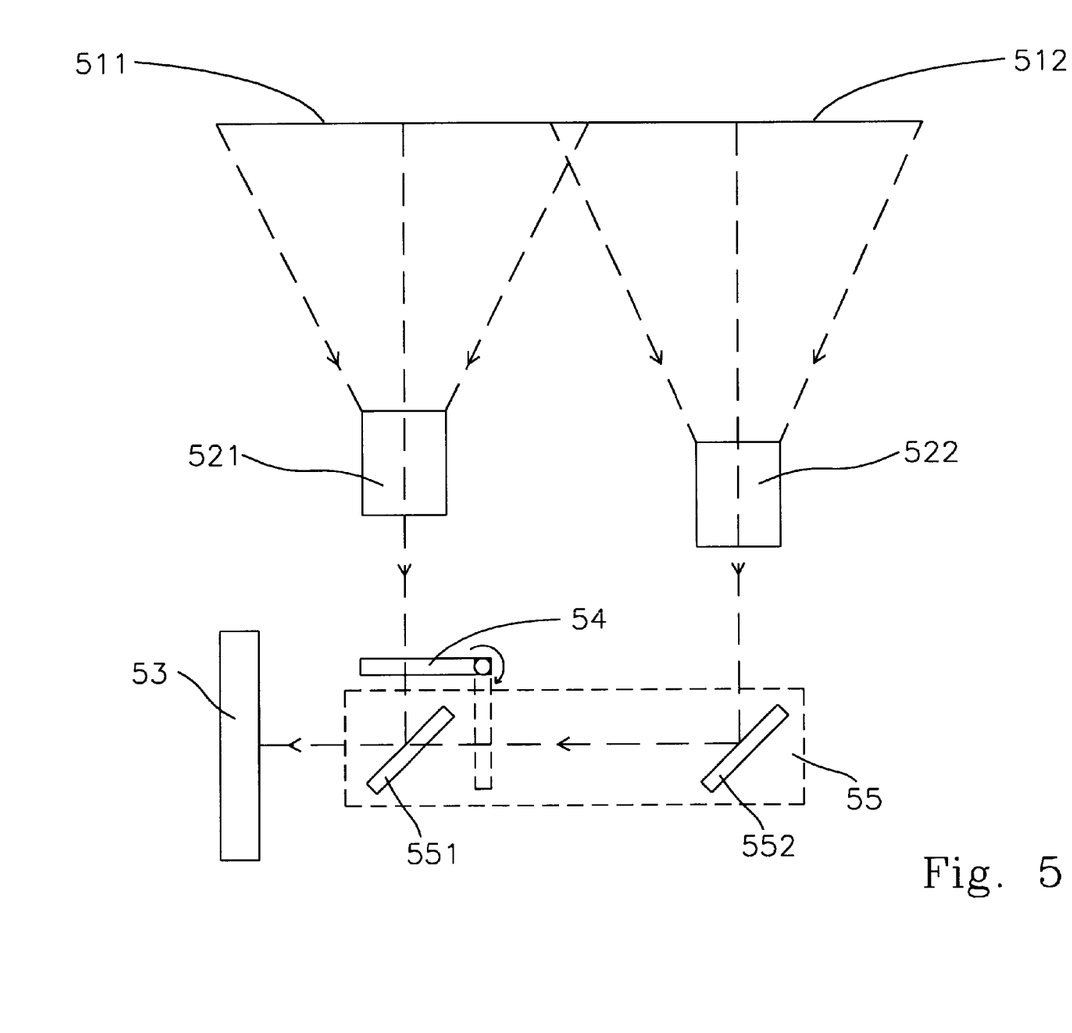
FIG. 5 is a schematic diagram showing a fourth preferred embodiment of the operation of a scanner according to the present invention.

In stead of movable light shade, a rotatable light shade can also perform well. Please refer to FIG. 5. This preferred embodiment is similar to the above-described embodiment shown in FIG. 3 except the rotatable light shade 54. There are two lens sets 521 and 522 mounted in specific locations and the magnifying power of the lens set 521 is the same as that of the lens set 522. The light-reflecting unit 55 includes a dichroic mirror 551 and a reflective mirror 552 corresponding to lens sets 521 and 522 respectively. The initial image is divided into two sections 511 and 512 to be scanned sequentially. The first initial image section 511 is focused by the lens set 521 for generating a first focused image section and the second initial image section 512 is focused by the lens set 522 for generating a second focused image section. Since the magnifying powers of the lens sets 521 and 522 are the same, the full image will not be distorted when these two focused image sections are combined together. The switching unit includes a rotatable light shade 54. First of all, the rotatable light shade 54 is rotated to be in a vertical direction between the dichroic mirror 551 and the reflective mirror 552 so that the second focused image section is obstructed. The first focused image section is transmitted to the charge coupled device 53 through the dichroic mirror 551 and is converted to electronic signals by the charge coupled device 53. Thereafter, the rotatable light shade 54 is rotated to be in a horizontal direction between the lens set 521 and the dichroic mirror 551. Therefore, the second focused image section, but not the first focused image section, can be received by the charge coupled device 53. Then, the second focused image section is converted to electronic signals. At last, all these generated electronic signals are transformed to digital data and a full image can be shown on a computer screen or other image processing equipments. It should be noted that the words "horizontal" and "vertical" shown in this paragraph are only used for illustrating this embodiment more clearly. The direction of rotatable light shade is not essential. The only matter borne in mind is that the rotatable light shade must completely obstruct the undesired focused image sections.

The number of the focusing units can be increased to meet one's requirement, especially from two to four. Their operating functions are similar to the ones as described above. A preferred embodiment of a scanner having three focusing units is described briefly as follows.

Embodiment 5

Figure 6:
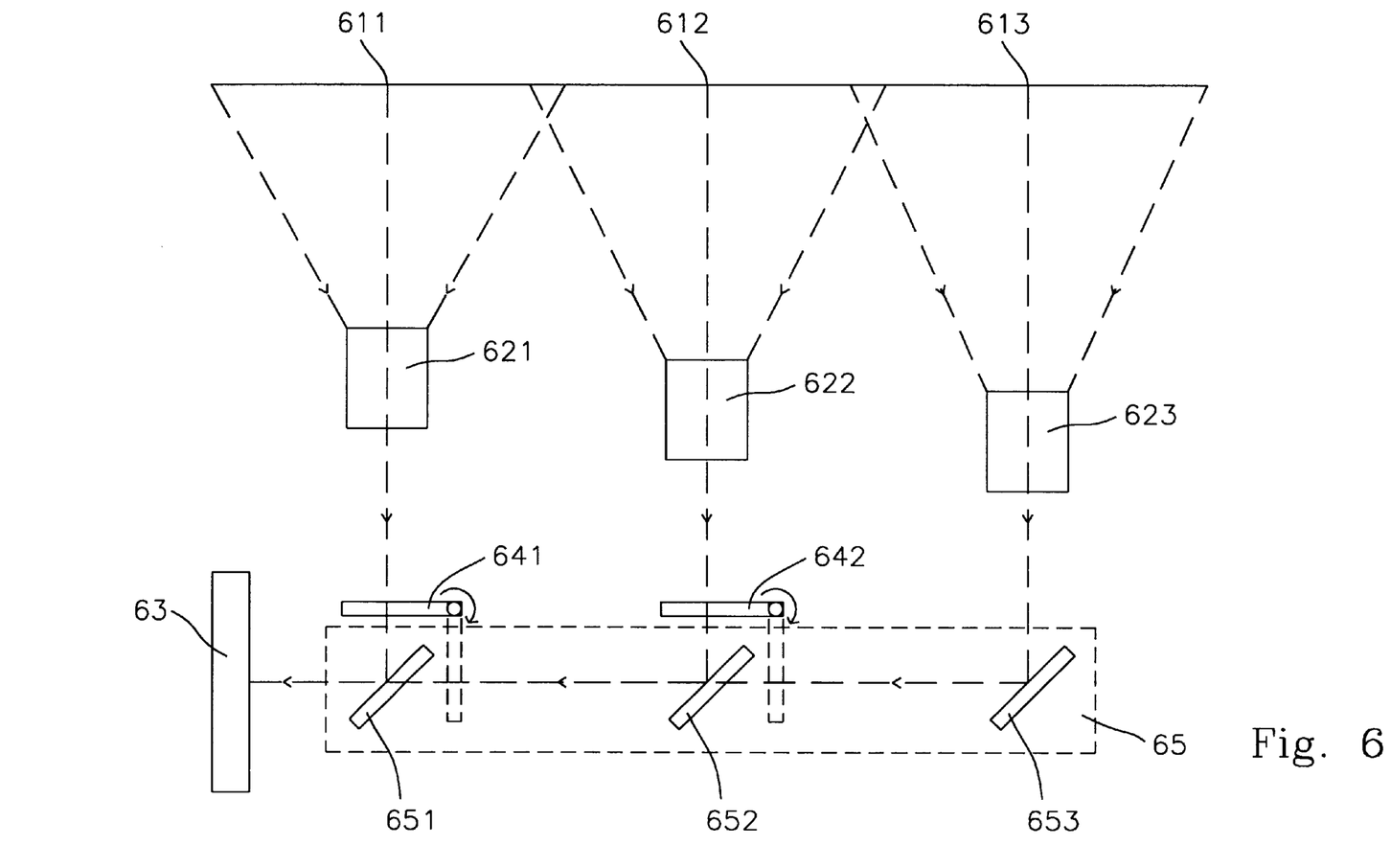
FIG. 6 is a schematic diagram showing a fifth preferred embodiment of the operation of a scanner according to the present invention.

Please refer to FIG. 6. There are three lens sets 621, 622, and 623 for focusing the left initial image section 611, the middle initial image section 612, and the right initial image section 613 to generate the left focused image section, the middle focused image section, and the right focused image section, respectively. The light-reflecting unit 65 also includes two dichroic mirrors 651, 652 and a reflective mirror 653 corresponding to lens sets 621, 622, 623. The words "left", "middle", and "right" should not be used to limit the scope of the present invention, but used to illustrate the preferred embodiment more clearly. Besides, the operating sequence also can be modified to make the method more convenient for the manufactures and users. At the first step, the rotatable light shade 641 is rotated to be in a vertical direction between the two dichroic mirrors 651 and 652. The left focused image section is transmitted from the lens set 621 to the charge coupled device 63 through the dichroic mirror 651, but the other focused image sections are obstructed. Then, the left focused image is converted to electronic signals by the charge coupled device 63. At the second step, the rotatable light shade 641 is rotated to be in a horizontal direction between the lens set 621 and the dichroic mirror 651, while the rotatable light shade 642 is rotated to be in a vertical direction between the dichroic mirror 652 and the reflective mirror 653. The middle focused image section is transmitted from the lens set 622 to the charge coupled device 63 through two dichroic mirrors 652 and 651 in sequence. Thereafter, it is converted to electronic signals by the charge coupled device 63. With regard to the other focused image sections, they are obstructed by the rotatable light shades 641 and 642. At the third step, the rotatable light shade 641 kept its position between the lens set 621 and the dichroic mirror 651, and the other rotatable light shade 642 is rotated to be in a horizontal direction between the lens set 622 and the dichroic mirror 652. The right focused image section, but not other focused image sections, is transmitted from the lens set 623 to the charge coupled device 63 through the reflective mirror 653 and two dichroic mirrors 652 and 651 in sequence. Thereafter, the right focused image section is received and converted to electronic signals by the charge coupled device 63. At last, all these electronic signals generated in the first, second, and third instances are transformed to digital data.

The feature of these two preferred embodiments is that the initial image is divided into many sections to be scanned in sequence. The number of the charge coupled devices or the pixels for a charge coupled device required for this case can be reduced without changing the resolution. The cost of some lens sets and a light-reflecting unit required for the embodiment according to the present invention are quite cheaper than that of a charge coupled device. Therefore, the cost can be significantly reduced, and the high quality can also be achieved. For instance, if a 600 dpi (dot per inch) resolution of an image is required, the charge coupled device with a 600 dpi must be equipped in the scanner according to the prior art. In the present invention, the charge coupled device with a 300 dpi is sufficient if there are two lens sets equipped in the scanner. Moreover, the charge coupled device with a 200 dpi can provide an image with 600 dpi resolution if there are three lens sets available for the scanner. Besides, another feature of these preferred embodiments is that the optical elements such as lens sets, light-reflecting unit, and the charge coupled device are immobily fixed in the housing. The method of the present invention is to obstruct undesired image sections substituted for capturing the desired image section. The precision of the scanner according to the present invention keeps unerring because the positions of the optical elements will not be affected by rotating the light shades. The other driving elements for the precision according to the prior arts are not required so the size and the production cost can be reduced significantly. Accordingly, the present invention really conforms to the genius of modem technology.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-lenses optical device for converting an initial image into electronic signals, comprising:
   a plurality of focusing units for focusing a plurality of sections of said initial image respectively, and correspondingly generating a plurality of focused image sections magnified with the same ratio and having different optical path lengths;
   a photoelectric conversion unit for converting said plurality of focused image sections to said electronic signals;
   a switching unit for sequentially having each one of said plurality of focused image sections selected and having said selected focused image section transmitted to said photoelectric conversion unit at an instant; and
   a light-reflecting unit mounted between said photoelectric conversion unit and said plurality of focusing units for transmitting said plurality of focused image sections to said photoelectric conversion unit, wherein said light-reflecting unit comprises a first dichroic mirror for transmitting said plurality of focused image sections to said photoelectric conversion unit and a second dichroic mirror for transmitting said plurality of focused image sections from said plurality of focusing units to said first dichroic mirror.

2. A multi-lenses optical device according to claim 1 wherein each of said plurality of focusing units is a lens set.

3. A multi-lenses optical device according to claim 2 wherein said lens sets are respectively mounted in specific locations for generating said plurality of focused image sections magnified with said same ratio.

4. A multi-lenses optical device according to claim 1 wherein said photoelectric conversion unit is a charge coupled device.

5. A multi-lenses optical device according to claim 1 wherein said light reflecting unit further comprises a reflective mirror for transmitting said plurality of focused image sections from said plurality of focusing units to said first dichroic mirror.

6. A multi-lenses optical device according to claim 1 wherein a number of said plurality of focusing units is from 2 to 4.

7. A multi-lenses optical device according to claim 1 wherein said switching unit is a light shade set.

8. A multi-lenses optical device according to claim 7 wherein said light shade set comprises a movable light shade.

9. A multi-lenses optical device according to claim 8 wherein said movable light shade is mounted within light paths of said plurality of sections of said initial image for shading said plurality of focusing units from said respective sections of said initial image except a selected section of said initial image corresponding to said selected focused image section.

10. A multi-lenses optical device according to claim 8 wherein said movable light shade is mounted between said light-reflecting unit and said plurality of focusing units for shading said light-reflecting unit from said plurality of focused image sections except said selected focused image section.

11. A multi-lenses optical device according to claim 8 wherein said movable light shade is mounted within said light-reflecting unit for shading said photoelectric conversion unit from said plurality of focused image sections except said selected focused image section.

12. A multi-lenses optical device according to claim 7 wherein said light shade set comprises a rotatable light shade.

13. A multi-lenses optical device according to claim 10 wherein said rotatable light shade is rotated to be in different directions for shading said photoelectric conversion unit from said plurality of focused image sections except said selected focused image section.

14. A multi-lenses optical device according to claim 13 wherein said rotatable light shade is mounted between said light-reflecting unit and said plurality of focusing units.

15. A multi-lenses optical device according to claim 13 wherein said rotatable light shade is mounted within said light-reflecting unit.

* * * * *